US009475908B2

(12) United States Patent
Yamasaki et al.

(10) Patent No.: US 9,475,908 B2
(45) Date of Patent: Oct. 25, 2016

(54) METHOD FOR PRODUCING PSEUDOPOLYROTAXANE AQUEOUS DISPERSION

(75) Inventors: Tomoaki Yamasaki, Hyogo (JP); Shinya Okazaki, Hyogo (JP); Hiroki Okazaki, Hyogo (JP); Shigeki Hamamoto, Hyogo (JP); Changming Zhao, Chiba (JP)

(73) Assignees: Sumitomo Seika Chemicals Co., Ltd., Hyogo (JP); Advanced Softmaterials Inc., Chiba (JP)

( * ) Notice: Subject to any disclaimer, the term of this patent is extended or adjusted under 35 U.S.C. 154(b) by 63 days.

(21) Appl. No.: 13/994,551

(22) PCT Filed: Dec. 5, 2011

(86) PCT No.: PCT/JP2011/078021
§ 371 (c)(1),
(2), (4) Date: Jul. 25, 2013

(87) PCT Pub. No.: WO2012/081431
PCT Pub. Date: Jun. 21, 2012

(65) Prior Publication Data
US 2013/0296547 A1 Nov. 7, 2013

(30) Foreign Application Priority Data

Dec. 16, 2010 (JP) .................. 2010-280264
Dec. 16, 2010 (JP) .................. 2010-280265
May 10, 2011 (JP) .................. 2011-105253

(51) Int. Cl.
*C08G 83/00* (2006.01)
*C08B 37/16* (2006.01)
*C08J 3/03* (2006.01)
*C08J 3/16* (2006.01)
*C08L 71/02* (2006.01)

(52) U.S. Cl.
CPC ......... *C08G 83/007* (2013.01); *C08B 37/0015* (2013.01); *C08G 83/008* (2013.01); *C08J 3/03* (2013.01); *C08J 3/16* (2013.01); *C08L 71/02* (2013.01); *C08J 2305/16* (2013.01); *C08J 2371/02* (2013.01)

(58) Field of Classification Search
CPC ............ C08B 37/0015; C08G 83/007; C08G 83/008; C08J 3/03; C08J 3/16; C08L 71/02; C08L 5/16
USPC ........................................................ 536/103
See application file for complete search history.

(56) References Cited

U.S. PATENT DOCUMENTS

| 5,855,900 | A | 1/1999 | Nobuhiko |
| 6,037,387 | A | 3/2000 | Yui et al. |
| 6,100,329 | A | 8/2000 | Gibson et al. |
| 6,828,378 | B2 | 12/2004 | Okumura et al. |
| 9,120,901 | B2 * | 9/2015 | Yamasaki ........... C08B 37/0015 |
| 2001/0033868 | A1 | 10/2001 | Rossling et al. |
| 2005/0101624 | A1 | 5/2005 | Betts et al. |
| 2005/0123614 | A1 | 6/2005 | Kim et al. |
| 2006/0069168 | A1 | 3/2006 | Tabata et al. |
| 2008/0097039 | A1 | 4/2008 | Ito et al. |
| 2009/0088546 | A1 * | 4/2009 | Ito et al. ............ 527/300 |
| 2009/0131588 | A1 | 5/2009 | Ito et al. |
| 2009/0312490 | A1 | 12/2009 | Ito et al. |
| 2009/0312491 | A1 | 12/2009 | Ito et al. |
| 2010/0274002 | A1 | 10/2010 | Amann et al. |
| 2013/0296546 | A1 | 11/2013 | Yamasaki et al. |
| 2013/0317209 | A1 | 11/2013 | Yamasaki et al. |
| 2013/0331562 | A1 | 12/2013 | Yamasaki et al. |
| 2014/0066615 | A1 | 3/2014 | Yamasaki et al. |
| 2014/0066616 | A1 | 3/2014 | Yamasaki et al. |

FOREIGN PATENT DOCUMENTS

| CN | 1426424 | 6/2003 |
| CN | 1910218 | 2/2007 |
| CN | 1938367 | 3/2007 |
| EP | 1 921 105 | 5/2008 |
| EP | 1 942 163 | 7/2008 |
| EP | 2 653 482 | 10/2013 |
| JP | 3-237103 | 10/1991 |
| JP | 2002-508401 | 3/2002 |
| JP | 2005-272664 | 10/2005 |
| JP | 2006-316089 | 11/2006 |
| JP | 2007-063412 | 3/2007 |
| JP | 2007-092024 | 4/2007 |
| JP | 2008-310286 | 12/2008 |
| WO | 99/30744 | 6/1999 |
| WO | WO 2005/080469 | 9/2005 |

OTHER PUBLICATIONS

Fleury et al. Synthesis and characterization of high molecular weight polyrotaxanes:towards the control over a wide range of threaded a-cyclodextrins. Soft Matter, 2005, 1, 378-385.*
"Kagaku Daijiten 2", Kyoritsu Shuppan Co., Ltd., 1993, Pocket Edition, $34^{th}$ Impression, pp. 658-659, with partial translation.

(Continued)

*Primary Examiner* — Clinton Brooks
*Assistant Examiner* — Yih-Horng Shiao
(74) *Attorney, Agent, or Firm* — Hamre, Schumann, Mueller & Larson, P.C.

(57) ABSTRACT

The present invention aims to provide an industrially advantageous method for producing an aqueous dispersion of pseudopolyrotaxane enabling to produce an aqueous dispersion of pseudopolyrotaxane having good fluidity and excellent dispersion stability of the pseudopolyrotaxane particles therein. The present invention relates to a method for producing an aqueous dispersion of pseudopolyrotaxane. The method includes: a mixing step of a dissolving polyethylene glycol and a cyclodextrin in an aqueous medium to prepare a mixed solution; and a cooling step of continuously or intermittently cooling the mixed solution in a state of flux to precipitate pseudopolyrotaxane particles. The pseudopolyrotaxane particles contain the polyethylene glycol which is included in the cavities of the cyclodextrin molecules in a skewered manner.

4 Claims, No Drawings

(56) References Cited

OTHER PUBLICATIONS

"Kagaku Daijiten 8", Kyoritsu Shuppan Co., Ltd., 1987, Pocket Edition, $30^{th}$ Impression, pp. 214-215, with partial translation.

Topchieva, et al., "Two-phase channel Structures Based on a-Cyclodextrin-Polyethylene Glycol Inclusion Complexes", Langmuir 20:9036-9043, 2004.

Hedges AR, "Industrial Applications of Cyclodextrins", Chem Rev 98:2035-2044, 1998.

Guo, et al., "Spray Drying ($1^{st}$ edition)", pp. 1-6, 1983 with a full English translation.

Liu et al., "Solvent-Free Synthesis of Unmodified Cyclodextrin-Based Pseudopolyrotaxane and Polyrotaxane by Grinding", Polymer Journal, vol. 39, No. 1, Jan. 15, 2007, pp. 21-23.

Fleury et al., "Synthesis and characterization of high molecular weight polyrotaxanes: towards the control over a wide range of threaded α-cyclodedextrins", Soft Matter, vol. 1, No. 5, Jan. 1, 2005, pp. 378-385.

Lavett, et al., "Vacuum Drying", The Journal of Industrial and Engineering Chemistry, vol. 13, No. 7, pp. 600-605, Jul. 1921.

Guo, et al., "Spray Drying (1st Edition)", pp. 191, 193-195, 1983 with a full English translation.

Form PTO-892 issued in co-pending U.S. Appl. No. 14/004,849 on Sep. 21, 2015 (1 page).

Pan, et al., "Modern Drying Technology, the 1st Edition", Chemical Industry Press, Sep. 30, 1998, line 1 on p. 121 to line 8 on p. 122—with a full translation.

* cited by examiner

METHOD FOR PRODUCING PSEUDOPOLYROTAXANE AQUEOUS DISPERSION

TECHNICAL FIELD

The present invention relates to a method for producing an aqueous dispersion of pseudopolyrotaxane.

BACKGROUND ART

"Slide-ring gels", new gels different from physical gels and chemical gels, have been developed in recent years. A compound that is used for such slide-ring gels and draws attention is a crosslinked polyrotaxane.

A crosslinked polyrotaxane has a structure in which linear molecules thread through cyclic molecules in a skewered manner and the cyclic molecules are movable along the linear molecules (a pulley effect). The pulley effect allows the crosslinked polyrotaxane to be viscoelastic and to uniformly distribute tensile force applied thereto. The crosslinked polyrotaxane is therefore not likely to have cracks or flaws, i.e., has excellent characteristics that conventional crosslinked polymers do not have. Such a crosslinked polyrotaxane is obtainable by placing a capping group at each end of a linear molecule of pseudopolyrotaxanes to prevent dissociation of the cyclic molecules of pseudopolyrotaxanes and crosslinking the resulting polyrotaxanes. The pseudopolyrotaxanes have a linear molecule which is included in the cavities of the cyclic molecules in a skewered manner.

The pseudopolyrotaxane used for production of a crosslinked polyrotaxane arises from mixing of a polyethylene glycol and a cyclodextrin in an aqueous medium, in general. Thus, the pseudopolyrotaxane is produced in a state of aqueous dispersion.

Patent Literature 1 discloses that a white gelatinous aqueous dispersion of pseudopolyrotaxane is obtainable by dissolving amino group-terminated polyethylene glycol with an average molecular weight of 2,000 and α-cyclodextrin in distilled water, then stirring the mixture for one hour at 80° C. to yield a transparent solution, and cooling the obtained transparent solution in a refrigerator (5° C.) overnight.

Patent Literature 2 discloses that a white paste-like aqueous dispersion of pseudopolyrotaxane is obtainable by dissolving polyethylene glycol bis(amine) with a number average molecular weight of 20,000 and α-cyclodextrin in water under heating up to 80° C., then cooling the obtained solution, and leaving the solution to stand at 5° C. for 16 hours.

Patent Literature 3 discloses that a cream-like aqueous dispersion of pseudopolyrotaxane is obtainable by dissolving carboxyl group-terminated polyethylene glycol and α-cyclodextrin in separately prepared warm water (70° C.), then blending the solutions, and leaving the mixture to stand in a refrigerator (4° C.) overnight.

CITATION LIST

Patent Literature

Patent Literature 1: JP 2006-316089 A (Japanese Kokai Publication No 2006-316099)
Patent Literature 2: JP 2008-310286 A (Japanese Kokai Publication No 2008-310286)
Patent Literature 3: WO 05/080469

SUMMARY OF INVENTION

Technical Problem

Efficient formation of a polyrotaxane by introduction of a capping group to each end of a pseudopolyrotaxane with a chemically stable bond can be achieved by a reaction between a polyethylene glycol (hereinafter, also referred to as a "PEG") with a —COOH group at each end and a capping group reactive with the —COOH group, such as a —NH$_2$ group or a —OH group.

This reaction of introducing a capping group to each end of a pseudopolyrotaxane, however, is deactivated by moisture in the system. Thus, the reaction requires the absence of water in the reaction system, or the water content controlled to an extremely slight amount, for efficient proceeding thereof. In other words, the aqueous dispersion of pseudopolyrotaxane requires sufficient elimination of water by drying the aqueous dispersion after solid-liquid separation by, for example, centrifugation or filtration, or drying without such separation.

The conventional techniques disclosed in Patent Literature documents 1 to 3 each provide a paste-like or cream-like aqueous dispersion of pseudopolyrotaxane with very low fluidity or a gelatinous aqueous dispersion of pseudopolyrotaxane with no fluidity. The paste-like or cream-like aqueous dispersion of pseudopolyrotaxane also loses its fluidity over time, and thus such an aqueous dispersion of pseudopolyrotaxane is hardly separated into solid and liquid by, for example, centrifugation or filtration before drying in the industrial context.

The present inventors have found that, in the case of drying without separation, the aqueous dispersion of pseudopolyrotaxane can yield a pseudopolyrotaxane with a high inclusion ratio in an industrially advantageous manner such that the dispersion is spray-dried, or is formed into a thin film, and then dried. However, the aqueous dispersions of a pseudopolyrotaxane obtained by any conventional technique have very low fluidity or are in the form of gel with no fluidity and, unfortunately, they are difficult to spray or to uniformly form into a thin film.

Further, this very low fluidity of the aqueous dispersion of pseudopolyrotaxane obtained by any conventional technique or no fluidity thereof in the form of gel causes difficulty in uniform stir-mixing of the dispersion having no or low fluidity with a capping agent that is used for introducing a capping group to each end of a pseudopolyrotaxane. In this case, the reaction nonuniformly proceeds.

In addition, the aqueous dispersion of pseudopolyrotaxane obtained by any conventional technique causes various troubles in the industrial-scale production of polyrotaxanes, such as difficulty in transportation of the aqueous dispersion of pseudopolyrotaxane between facilities such as transportation from preparation tank to drying equipment.

The fluidity of the aqueous dispersion of pseudopolyrotaxane may be improved by adding a dispersion medium to decrease the concentration of pseudopolyrotaxane in the aqueous dispersion of pseudopolyrotaxane. This method, however, not only causes poor productivity, which means wastefulness, but also induces dissociation of cyclodextrins, likely resulting in a decrease in the inclusion ratio of the pseudopolyrotaxane.

The "inclusion ratio" herein refers a ratio of the inclusion amount of cyclodextrin molecules including a PEG to the maximum inclusion amount of cyclodextrin molecules for the PEG. The inclusion ratio is optionally controllable by changing the mixing ratio of the PEG to cyclodextrin or the kind of aqueous medium. The maximum inclusion amount refers to the number of cyclodextrin molecules in the case of the close-packed state in which one cyclodextrin molecule includes two repeating units of the PEG.

The present invention aims to provide an industrially advantageous method for producing an aqueous dispersion of pseudopolyrotaxane capable of solving the aforementioned problems and enabling to produce an aqueous dispersion of pseudopolyrotaxane with high fluidity and excellent dispersion stability of pseudopolyrotaxane particles.

Solution to Problem

The present invention relates to a method for producing an aqueous dispersion of pseudopolyrotaxane, the method comprising: a mixing step of dissolving a polyethylene glycol and a cyclodextrin in an aqueous medium to prepare a mixed solution; and a cooling step of continuously or intermittently cooling the mixed solution in a state of flux to precipitate pseudopolyrotaxane particles, wherein the pseudopolyrotaxane particles contain the polyethylene glycol which is included in the cavities of the cyclodextrin molecules in a skewered manner.

The following will specifically describe the present invention.

The present inventors have found that an aqueous dispersion of pseudopolyrotaxane excellent in fluidity and dispersion stability of pseudopolyrotaxane particles can be industrially advantageously produced by dissolving a PEG and a cyclodextrin in an aqueous medium to prepare a mixed solution and then continuously or intermittently cooling the mixed solution in a state of flux to precipitate pseudopolyrotaxane particles. Thereby, the present inventors have completed the present invention.

The method for producing an aqueous dispersion of pseudopolyrotaxane of the present invention comprises a step of dissolving a PEG and a cyclodextrin in an aqueous medium to prepare a mixed solution.

The PEG preferably has a weight average molecular weight of 1,000 to 500,000, more preferably 10,000 to 300,000, and still more preferably 10,000 to 100,000. A weight average molecular weight of the PEG of less than 1,000 may cause a crosslinked polyrotaxane to have poor characteristics. A weight average molecular weight of the PEG of more than 500,000 may cause an aqueous dispersion of pseudopolyrotaxane to have low fluidity.

The weight average molecular weight herein is a polyethylene glycol equivalent value calculated through measurement by gel permeation chromatography (GPC). A column used for determination of polyethylene glycol equivalent weight average molecular weight by GPC is, for example, TSKgel Super AWM-H (TOSOH CORP.).

The PEG preferably has a reactive group at each end of the molecule. The reactive group can be introduced at each end of the PEG by a conventionally known method.

The reactive group at each end of the PEG can be appropriately changed depending on the capping group to be used. Examples of the reactive group include but not particularly limited to, hydroxy groups, amino groups, carboxyl groups, and thiol groups. Carboxyl group are particularly preferred. Examples of the method for introducing a carboxyl group at each end of the PEG include by a method of oxidizing each end of the PEG using TEMPO (2,2,6,6-tetramethyl-1-piperidinyloxy radical) and sodium hypochlorite.

In the mixing step, the weight ratio between PEG and cyclodextrin is preferably 1:2 to 1:5, more preferably 1:2.5 to 1:4.5, and still more preferably 1:3 to 1:4. A weight of cyclodextrin of less than twice the weight of PEG may decrease the number (i.e., inclusion amount) of cyclodextrin molecules including the PEG. A weight of cyclodextrin of more than five times the weight of PEG may not increase the inclusion amount further, and thus is not economical.

Examples of the cyclodextrin include α-cyclodextrin, β-cyclodextrin, γ-cyclodextrin, and derivatives of these cyclodextrins. Particularly in terms of inclusion property, α-cyclodextrin is preferred. These cyclodextrins may be used alone or in combination.

Examples of the aqueous medium include water, and an aqueous mixture of water and an aqueous organic solvent such as DMF and DMSO. Particularly, water is preferred.

In the mixing step, the PEG and the cyclodextrin may be dissolved in an aqueous medium and this mixture is typically heated to 50° C. to 100° C., preferably 60° C. to 90° C., and more preferably 70° C. to 80° C., so that the PEG and the cyclodextrin are dissolved in the aqueous medium. This provides a substantially transparent mixed solution.

The method for producing an aqueous dispersion of pseudopolyrotaxane of the present invention comprises a step of continuously or intermittently cooling the mixed solution in a state of flux to precipitate the pseudopolyrotaxane particles. The cooling step allows the pseudopolyrotaxane particles each containing a PEG and cyclodextrin molecules to precipitate and enables to yield a substantially white aqueous dispersion of pseudopolyrotaxane.

If the mixed solution is cooled by a conventional method, in other words, the mixed solution is left to stand for precipitation of pseudopolyrotaxane particles, the resulting aqueous dispersion of pseudopolyrotaxane is turned into the form of paste or cream which has very low fluidity, or into the form of gel which has no fluidity. In contrast, the method for producing an aqueous dispersion of pseudopolyrotaxane of the present invention allows the mixed solution to be continuously or intermittently cooled in a state of flux, and thereby allows the pseudopolyrotaxane particles to precipitate. As a result, an aqueous dispersion of pseudopolyrotaxane has good fluidity that is not reduced over time.

The fluidity herein means, for example, easiness for an aqueous dispersion of pseudopolyrotaxane to flow by its own weight when the aqueous dispersion of pseudopolyrotaxane is put in a container and the container is tilted. One exemplary indicator for evaluating the fluidity is a viscosity of a pseudopolyrotaxane dispersion to be mentioned later.

In the cooling step, the end-point temperature is preferably 0° C. to 30° C., more preferably 5° C. to 20° C., and still more preferably 5° C. to 15° C. A mixed solution cooled down to lower than 0° C. may freeze the aqueous dispersion of pseudopolyrotaxane to decrease the fluidity. An end-point temperature of the mixed solution of higher than 30° C. may not sufficiently precipitate pseudopolyrotaxane particles.

The cooling step is preferably performed at a cooling speed of 0.01° C. to 30° C./min, more preferably 0.05° C. to 20° C./min, and still more preferably 0.05° C. to 10° C./min. A cooling speed of lower than 0.01° C./min may cause precipitated pseudopolyrotaxane particles to be too minute, likely resulting in low fluidity of the aqueous dispersion of pseudopolyrotaxane. A cooling speed of higher than 30° C./min may cause pseudopolyrotaxane particles to be too large, likely resulting in poor dispersion stability and sedimentation.

For more thorough precipitation of pseudopolyrotaxane particles, intermittent cooling is also possible as described above. Also, the cooling speed or the flowing state of the mixed solution can be changed during the cooling.

The time for retaining the flowing state of the resulting aqueous dispersion of pseudopolyrotaxane after the mixed solution is cooled to a desired temperature is typically several seconds to one week, and preferably several hours to three days.

During the cooling of the mixed solution in the cooling step, the mixed solution may be flowed by stirring with a stirring blade or ultrasonic irradiation, for example. Alternatively, the mixed solution may be cooled in a condenser such as a double-pipe condenser. In this case, the mixed solution is delivered into the condenser by a pump such as roller pump) while a cooling medium is passed through the outside pipe, and they are repeatedly circulated in the pipes so that the mixed solution is cooled down.

The degree of flowing the mixed solution is not particularly limited, and may be appropriately adjusted from a slightly flowing state achieved by gentle stirring to a strongly flowing state achieved by vigorous stirring with, for example, a homogenizer. Too slight a flowing state may cause large pseudopolyrotaxane particles to precipitate, and the dispersion stability may be poor and the particles may sediment. Too excessive a flowing state may cause too minute pseudopolyrotaxane particles to precipitate, and the fluidity of the aqueous dispersion of pseudopolyrotaxane to be obtained may be poor. Thus, the flowing state of the mixed solution during the cooling is preferably adjusted such that the volume average particle size to be mentioned later of the particles in the aqueous dispersion of pseudopolyrotaxane is within the predetermined range.

For example, in the case of flowing the mixed solution by stirring with a stirring blade, the tip speed of the stirring blade is preferably 0.1 to 50 m/sec, and more preferably 1 to 30 m/sec.

The volume average particle size of the particles in the aqueous dispersion of pseudopolyrotaxane depends on the factors such as cooling speed, end-point temperature after cooling, and flowing state of the mixed solution during cooling. The present inventors have found that particles in the aqueous dispersion of pseudopolyrotaxane with a volume average particle size within a predetermined range enable to lead to an aqueous dispersion of pseudopolyrotaxane with good fluidity and excellent dispersion stability of the particles therein; in other words, the aqueous dispersion has good fluidity that does not deteriorate over time and the particles do not sediment.

The volume average particle size of the particles in the aqueous dispersion of pseudopolyrotaxane is preferably 1 to 200 µm, more preferably 1 to 100 µm, and still more preferably 1 to 50 µm. If the volume average particle size of the particles in the aqueous dispersion of pseudopolyrotaxane is less than 1 µm, the dispersion may show decreased fluidity or no fluidity. If the volume average particle size of the particles in the aqueous dispersion of pseudopolyrotaxane is more than 200 µm, the particles in the aqueous dispersion of pseudopolyrotaxane may be sedimented.

The volume average particle size of the particles in the aqueous dispersion of pseudopolyrotaxane herein can be analyzed using a laser diffraction particle size analyzer.

The pseudopolyrotaxane concentration of the aqueous dispersion of pseudopolyrotaxane (hereinafter, also referred to as solids concentration) is preferably 5 to 25% by weight, more preferably 5 to 20% by weight, and still more preferably 10 to 20% by weight. A solids concentration of the aqueous dispersion of pseudopolyrotaxane of lower than 5% by weight is not economical. A solids concentration of the aqueous dispersion of pseudopolyrotaxane of higher than 25% by weight may have poor fluidity.

A viscosity of the aqueous dispersion of pseudopolyrotaxane preferably of 10,000 mPa·s or lower, more preferably 7,000 mPa·s or lower, and still more preferably 5,000 mPa·s or lower.

A viscosity of the aqueous dispersion of pseudopolyrotaxane of higher than 10,000 mPa·s, the aqueous dispersion of pseudopolyrotaxane may have poor fluidity. Thus, the dispersion may be difficult to process in an industrial scale, such as solid-liquid separation, uniform stir-mixing, transportation between facilities, and spray-drying.

The viscosity of the aqueous dispersion of pseudopolyrotaxane herein may be analyzed using a Brookfield viscometer at 10° C. and 6 rpm.

Advantageous Effects of Invention

The present invention enables to produce an aqueous dispersion of pseudopolyrotaxane with excellent fluidity. This results in easiness of solid-liquid separation of the obtained aqueous dispersion of pseudopolyrotaxane as by centrifugation or filtration; easiness of spray-drying the dispersion or forming the dispersion into a thin film to dry; and easiness of transportation between facilities.

Further, the aqueous dispersion of pseudopolyrotaxane to be obtained by the method for producing an aqueous dispersion of pseudopolyrotaxane of the present invention contains pseudopolyrotaxane particles with excellent dispersion stability. This enables uniform proceeding of reaction of introducing a capping group to each end of the pseudopolyrotaxane.

DESCRIPTION OF EMBODIMENTS

The present invention will be described below in more detail based on examples which, however, are not intended to limit the scope of the present invention. In the following, a PEG having a carboxyl group at each end was produced by oxidation of PEG in accordance with the method described in WO 05/052026.

Production Example 1

In a 500-mL flask, 16 g of a PEG (weight average molecular weight: 35,000), 0.16 g of TEMPO (2,2,6,6-tetramethyl-1-piperidinyloxy radical), and 1.6 g of sodium bromide were dissolved in 160 mL of water. To the solution was added 8 mL of an aqueous solution of sodium hypochlorite (effective chlorine concentration: 5%), and the resulting mixture was stirred at room temperature for 30 minutes. An amount of 8 mL of ethanol was added to decompose the excess of sodium hypochlorite and terminate the reaction.

An organic layer was isolated by repeating extraction with 80 mL of methylene chloride three times using a separating funnel, and the methylene chloride was distilled off using an evaporator. The resulting substance was dissolved in 400 mL of warm ethanol, and the solution was allowed to stand in a freezer (−4° C.) overnight, so that only a PEG having a carboxyl group at each end of the linear molecule was precipitated. The PEG was collected and dried under reduced pressure. Thereby, 16 g of a PEG having a carboxyl group at each end of the linear molecule was obtained.

Production Example 2

In a 500-mL flask, 16 g of a high-molecular-weight PEG (weight average molecular weight: 100,000), 0.16 g of TEMPO (2,2,6,6-tetramethyl-1-piperidinyloxy radical), and 1.6 g of sodium bromide were dissolved in 160 mL of water. To the solution was added 8 mL of an aqueous solution of sodium hypochlorite (effective chlorine concentration: 5%), and the resulting mixture was stirred at room temperature for 30 minutes. An amount of 8 mL of ethanol was added to decompose the excess of sodium hypochlorite and terminate the reaction.

An organic layer was isolated by repeating extraction with 80 mL of methylene chloride three times using a separating funnel, and the methylene chloride was distilled off using an evaporator. The resulting substance was dissolved in 400 mL of warm ethanol, and the solution was allowed to stand in a freezer (−4° C.) overnight, so that only a PEG having a carboxyl group at each end of the linear molecule was precipitated. The PEG was collected and dried under reduced pressure. Thereby, 16 g of a PEG having a carboxyl group at each end of the linear molecule was obtained.

Example 1

A 1-L flask with a stirrer was charged with 520 mL of water, 16 g of the PEG having a carboxyl group at each end of the linear molecule prepared in Production Example 1, and 64 g of α-cyclodextrin, and the mixture was stirred using a stirring blade at a rotational speed of 250 rpm. Thereby, the mixture was heated up to 75° C. to be dissolved in water.

The rotational speed of the stirring blade was accelerated to 650 rpm (tip speed: 2.5 m/sec) and the mixture was stirred at this rotational speed. Simultaneously, the mixture was cooled down to 5° C. at a cooling speed of 0.4° C./min. The mixture was further stirred for 10 hours at this temperature, thereby yielding a milky aqueous dispersion of pseudopolyrotaxane (solids concentration: 13% by weight) with good fluidity. The viscosity of the obtained aqueous dispersion of pseudopolyrotaxane was measured using a BL-type Brookfield viscometer (spindle No. 4) at 10° C. and 6 rpm, and was 220 mPa·s.

Further, the volume average particle size of the particles in the aqueous dispersion of pseudopolyrotaxane was measured using a laser diffraction particle size analyzer, and was 9 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 240 mPa·s. No particles sedimented after the whole-day-and-night standing; that is, the dispersion stability was good.

Example 2

A 1-L flask with a stirrer was charged with 520 mL of water, 16 g of the PEG having a carboxyl group at each end prepared in Production Example 1, and 64 g of α-cyclodextrin and the mixture was stirred using a stirring blade at a rotational speed of 250 rpm. Thereby, the mixture was heated up to 75° C. and the components were dissolved in water.

The rotational speed of the stirring blade was accelerated to 650 rpm (tip speed: 2.5 m/sec), and the mixture was stirred at this rotational speed. Simultaneously, the mixture was cooled down to 20° C. at a cooling speed of 0.4° C./min. The stirring at the same rotational speed at 20° C. was continued for 30 minutes, and then the mixture was again cooled down to 5° C. at a cooling speed of 0.4° C./min. The mixture was further stirred for 10 hours at the same temperature, thereby yielding an aqueous dispersion of pseudopolyrotaxane (solids concentration: 13% by weight).

The prepared aqueous dispersion of pseudopolyrotaxane was a milky dispersion with fluidity, and the viscosity and the particle size were measured by the same methods as in Example 1. The measurement showed that the viscosity of the aqueous dispersion of pseudopolyrotaxane was 240 mPa·s and the volume average particle size of the particles in the aqueous dispersion of pseudopolyrotaxane was 7 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 260 mPa·s. No particles sedimented after the whole-day-and-night standing; that is, the dispersion stability was good.

Example 3

An aqueous dispersion of pseudopolyrotaxane was obtained in the same manner as in Example 1 except that the amount of water for dissolving the PEG having a carboxyl group at each end and α-cyclodextrin was 400 ml (solids concentration in aqueous dispersion of pseudopolyrotaxane: 17% by weight). The prepared aqueous dispersion of pseudopolyrotaxane was a milky dispersion with fluidity, and the viscosity and the particle size were measured by the same methods as in Example 1. The measurement showed that the viscosity of the aqueous dispersion of pseudopolyrotaxane was 500 mPa·s and the volume average particle size of the particles in the aqueous dispersion of pseudopolyrotaxane was 16 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 600 mPa·s. No particles sedimented after the whole-day-and-night standing; that is, the dispersion stability was good.

Example 4

An aqueous dispersion of pseudopolyrotaxane was obtained in the same manner as in Example 1 except that the stirring speed of a stirring blade was 550 rpm (tip speed: 2.1 m/sec) and the cooling speed was 0.1° C./min during the cooling. The prepared aqueous dispersion of pseudopolyrotaxane was a milky dispersion with good fluidity, and the viscosity and the particle size were measured by the same methods as in Example 1. The measurement showed that the viscosity of the aqueous dispersion of pseudopolyrotaxane was 190 mPa·s and the volume average particle size of the particles in the aqueous dispersion of pseudopolyrotaxane was 19 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 210 mPa·s. No particles sedimented after the whole-day-and-night standing; that is, the dispersion stability was good.

Example 5

An aqueous dispersion of pseudopolyrotaxane was obtained in the same manner as in Example 1 except that the stirring speed of a stirring blade was 550 rpm (tip speed: 2.1 m/sec) and the cooling speed was 10° C./min during the cooling. The prepared aqueous dispersion of pseudopolyrotaxane was a milky dispersion with good fluidity, and the viscosity and the particle size were measured by the same methods as in Example 1. The measurement showed that the aqueous dispersion of pseudopolyrotaxane had a viscosity of 180 mPa·s and the particles in the aqueous dispersion of pseudopolyrotaxane had a volume average particle size of 34 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 200 mPa·s. No particles sedimented after the whole-day-and-night standing; that is, the dispersion stability was good.

Example 6

An aqueous dispersion of pseudopolyrotaxane was obtained in the same manner as in Example 1 except that the stirring speed of a stirring blade was 100 rpm (tip speed: 0.4 m/sec) and the cooling speed was 0.1° C./min during the cooling. The prepared aqueous dispersion of pseudopolyrotaxane was a milky dispersion with good fluidity, and the viscosity and the particle size were measured by the same methods as in Example 1. The measurement showed that the viscosity of the aqueous dispersion of pseudopolyrotaxane was 160 mPa·s and the volume average particle size of the particles in the aqueous dispersion of pseudopolyrotaxane was 47 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 190 mPa·s. No particles sedimented after the whole-day-and-night standing; that is, the dispersion stability was good.

Example 7

An aqueous dispersion of pseudopolyrotaxane was obtained in the same manner as in Example 2 except that the stirring speed of a stirring blade was 7,500 rpm (tip speed: 29 m/sec) and the cooling speed was 22° C./min during the cooling. The prepared aqueous dispersion of pseudopolyrotaxane was a milky dispersion with fluidity, and the viscosity and the particle size were measured by the same methods as in Example 1. The measurement showed that the aqueous dispersion of pseudopolyrotaxane had a viscosity of 940 mPa·s and the particles in the aqueous dispersion of pseudopolyrotaxane had a volume average particle size of 2 μm. The aqueous dispersion of pseudopolyrotaxane showed fluidity after left to stand a whole-day-and-night. The viscosity of the aqueous dispersion of pseudopolyrotaxane after the standing was measured by the same method, and was 1,000 mPa·s. No particles sedimented after the whole-day-and-night standing; that is, the dispersion stability was good.

Example 8

An aqueous dispersion of pseudopolyrotaxane was obtained in the same manner as in Example 1 except that the PEG having a carboxyl group at each end and α-cyclodextrin were dissolved in water by heating up to 70° C. to prepare an aqueous solution thereof, and then the solution was delivered by a roller pump into a double-pipe condenser while a cooling medium (5° C. to 70° C.) was passed through the outer pipe. They were repeatedly circulated to be cooled down to 5° C. (cooling speed: 0.4° C./min), and further circulated for 10 hours at the same temperature. The prepared aqueous dispersion of pseudopolyrotaxane was a milky dispersion with fluidity, and the viscosity and the particle size were measured by the same method as in Example 1. The measurement showed that the viscosity of the aqueous dispersion of pseudopolyrotaxane was 200 mPa·s and the volume average particle size of the particles in the aqueous dispersion of pseudopolyrotaxane was 12 μm. The aqueous dispersion of pseudopolyrotaxane kept its fluidity after left to stand a whole-day-and-night. The viscosity of the aqueous dispersion of pseudopolyrotaxane after the standing was also measured by the same method, and was 220 mPa·s. No particles sedimented after the whole-day-and-night standing; that is, the dispersion stability was good.

Example 9

An aqueous dispersion of pseudopolyrotaxane was obtained in the same manner as in Example 1 except that the PEG having a carboxyl group at each end prepared in Production Example 2 was used instead of the PEG having a carboxyl group at each end prepared in Production Example 1. The prepared aqueous dispersion of pseudopolyrotaxane was a milky dispersion with fluidity, and the viscosity and the particle size were measured by the same methods as in Example 1. The measurement showed that the viscosity of the aqueous dispersion of pseudopolyrotaxane was 2,800 mPa·s and the volume average particle size of the particles in the aqueous dispersion of pseudopolyrotaxane was 13 μm. The aqueous dispersion of pseudopolyrotaxane showed fluidity after left to stand a whole-day-and-night. The viscosity of the aqueous dispersion of pseudopolyrotaxane after the standing was also measured by the same method, and was 3,000 mPa·s. No particles sedimented after the whole-day-and-night standing; that is, the dispersion stability was good.

Comparative Example 1

An aqueous dispersion of pseudopolyrotaxane was obtained in the same manner as in Example 1 except that the mixture was cooled while left to stand without stirring (cooling speed: 0.4° C./min). The prepared aqueous dispersion of pseudopolyrotaxane had only a slight fluidity and was paste-like, and the viscosity was measured by the same method as in Example 1. The measurement showed that the viscosity of the aqueous dispersion of pseudopolyrotaxane was 90,000 mPa·s. Further, the particle size was measured using a laser diffraction particle size analyzer, but the measurement failed to provide an accurate particle size.

The aqueous dispersion of pseudopolyrotaxane lost most of its fluidity after left to stand a whole-day-and-night. The viscosity of the aqueous dispersion of pseudopolyrotaxane after the standing was also measured by the same method, and was 100,000 mPa·s or higher (the measurement limit or higher).

Comparative Example 2

An aqueous dispersion of pseudopolyrotaxane was obtained in the same manner as in Example 9 except that the mixture was cooled while left to stand without stirring (cooling speed: 0.4° C./min). The prepared aqueous dispersion of pseudopolyrotaxane showed no fluidity. The viscosity was measured by the same method as in Example 1, and the measurement showed that the viscosity of the aqueous dispersion of pseudopolyrotaxane was 100,000 mPa·s. Further, the particle size was measured using a laser diffraction particle size analyzer, but the measurement failed to provide an accurate particle size.

The aqueous dispersion of pseudopolyrotaxane turned into the form of slightly elastic gel after left to stand a whole-day-and-night. The viscosity of the aqueous dispersion of pseudopolyrotaxane after the standing was measured by the same method, and was 100,000 mPa·s or higher (the measurement limit or higher).

INDUSTRIAL APPLICABILITY

The present invention can provide a method for producing an aqueous dispersion of pseudopolyrotaxane enabling to produce an aqueous dispersion of pseudopolyrotaxane with good fluidity and excellent dispersion stability of the pseudopolyrotaxane particles by an industrially advantageous method.

The invention claimed is:

1. A method for producing an aqueous dispersion of pseudopolyrotaxane, the method comprising:
   a mixing step of dissolving polyethylene glycol and cyclodextrin in an aqueous medium so as to prepare a mixed solution; and
   a cooling step of continuously or intermittently cooling the mixed solution in a flux state without being left to stand so as to precipitate pseudopolyrotaxane particles,
   wherein a weight ratio between polyethylene glycol and cyclodextrin is in a range from 1:3 to 1:5,
   the pseudopolyrotaxane particles contain the polyethylene glycol that is included in the cavities of the cyclodextrin molecules in a skewered manner,
   wherein an end-point temperature of the cooling in the cooling step is in a range from 5° C. to 20° C.,
   a cooling speed in the cooling step is in a range from 0.01° C. to 30° C./min,
   the cooling step of the continuously or intermittently cooling the mixed solution is preformed while continuously stirring the mixed solution with a stirring blade, and
   a tip speed of the stirring blade used in the cooling step is in a range from 0.1 to 50 m/sec.

2. The method for producing the aqueous dispersion of pseudopolyrotaxane according to claim 1,
   wherein the polyethylene glycol has a weight average molecular weight in a range from 1,000 to 500,000.

3. The method for producing the aqueous dispersion of pseudopolyrotaxane according to claim 1,
   wherein the aqueous dispersion of pseudopolyrotaxane has a solid concentration in a range from 5 to 25% by weight.

4. The method for producing the aqueous dispersion of pseudopolyrotaxane according to claim 1,
   wherein the particles in the aqueous dispersion of pseudopolyrotaxane have a volume average particle size in a range from 1 to 200 µm.

* * * * *

UNITED STATES PATENT AND TRADEMARK OFFICE
CERTIFICATE OF CORRECTION

PATENT NO.         : 9,475,908 B2                                              Page 1 of 1
APPLICATION NO.    : 13/994551
DATED              : October 25, 2016
INVENTOR(S)        : Yamasaki et al.

It is certified that error appears in the above-identified patent and that said Letters Patent is hereby corrected as shown below:

In the Claims

Column 11, Line 27: delete "precipitate" and insert --prepare--.

Column 12, Line 4: delete "wherein".

Signed and Sealed this
Seventh Day of March, 2017

Michelle K. Lee
*Director of the United States Patent and Trademark Office*